United States Patent [19]
Wood et al.

[11] Patent Number: 4,484,186
[45] Date of Patent: Nov. 20, 1984

[54] EARTHQUAKE INDICATOR

[76] Inventors: Lawrence R. Wood, c/o George Spector 3615 Woolworth Bldg. 233 Broadway; George Spector, c/o Lawrence R. Wood 3615 Woolworth Bldg. 233 Broadway, both of New York, N.Y. 10007

[21] Appl. No.: 323,659

[22] Filed: Nov. 20, 1981

[51] Int. Cl.³ .............................................. G08B 21/00
[52] U.S. Cl. .................................. 340/689; 33/391; 33/402; 73/652; 116/303; 200/61.52; 340/690
[58] Field of Search .................................. 340/689, 690; 200/61.52, 61.47; 116/303; 33/391, 402; 73/652

[56] References Cited
U.S. PATENT DOCUMENTS

| 2,344,014 | 3/1944 | Allison | 200/61.47 |
| 2,486,697 | 11/1949 | White | 33/402 X |
| 3,597,753 | 8/1971 | Tabankin | 200/61.52 X |
| 4,297,690 | 10/1981 | Baker | 340/690 |

Primary Examiner—David L. Trafton

[57] ABSTRACT

A novelty for apparently indicating earthquakes, including a circular base marked with concentric circles on its upper side defining different earthquake intensities, a frame upon the base supporting a freely depending electrical contact through a supported circular contact so that in case the device is tilted, the contacts touch and thus close a circuit to a warning alarm.

3 Claims, 3 Drawing Figures

U.S. Patent   Nov. 20, 1984   4,484,186
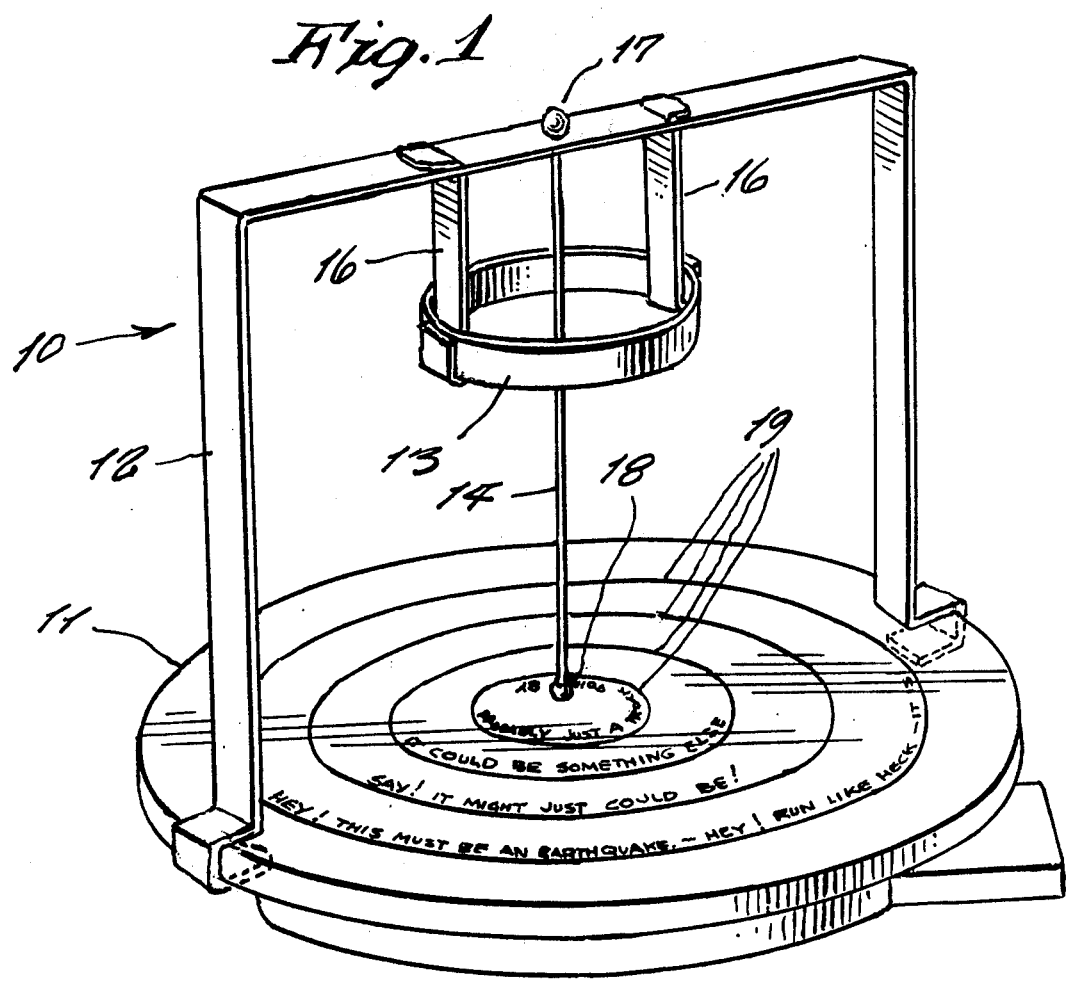
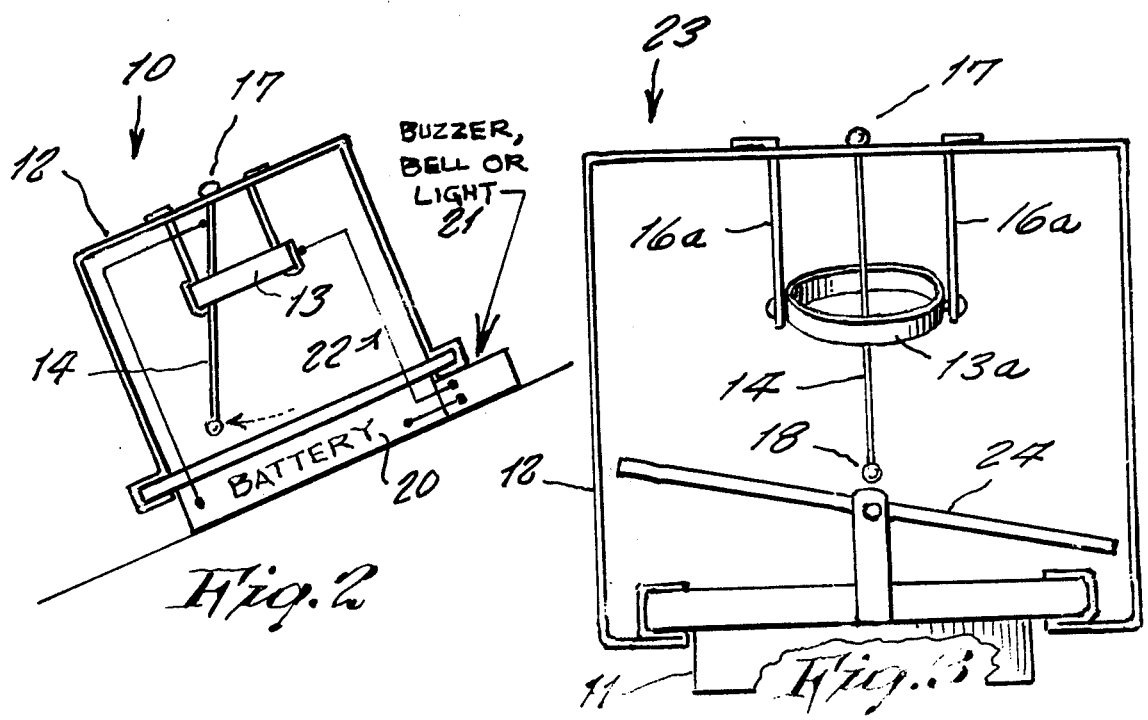

EARTHQUAKE INDICATOR

This invention relates generally to entertaining gadgets. More specifically it relates to a novelty earthquake indicator, and is not to be confused with serious scientific instruments such as are used in making complex studies of earth tremors.

A principal object of the present invention is to provide a novelty gadget for entertainment use by apparently forecasting an earthquake and sounding a warning alarm to persons who are located nearby, so that they proceed to look for shelter from an earthquake.

Another object is to provide an entertainment novelty that is adapatable to be a displayed conversation piece for both adults and children.

FIG. 1 is a perspective view of the invention.

FIG. 2 is a side view thereof shown in use.

FIG. 3 is a side view of another design thereof in which both the dial and the ring are tiltable about axes at right angle to each other so that the device is adjustable in operation.

Referring now to the drawing in greater detail, and more particularly to FIGS. 1 and 2 thereof, at this time, the reference numeral 10 represents a novelty earthquake indicator, according to the present invention, wherein there is a circular base 11, an inverted U-shaped frame 12 mounted upon the base, and the frame supporting a circular metal ring 13 in spaced relation around a metal rod 14 depending from a center of the frame. The metal ring is affixed to a pair of spaced apart, metal strips 16 extending downward from an underside of the U-shaped frame.

The rod 14 includes a relatively enlarged spherical ball 17 at its upper end which seats over a hole in the frame and through which the rod depends downwardly. Another enlarged spherical ball 18 at a lower end of the rod serves as a weight so as to maintain the rod in the vertically depending position. The ball 18 hangs directly over a center of the circular base, when the base is in a horizontal position, and the ball 18 clears the upper surface of the base, in order to be free for swinging in any sidewardly direction.

As shown in FIG. 1, a plurality of concentric circles 19 are marked upon the upper surface of the base, so that when the present device is tilted, such as in an apparent earthquake, the lower ball 18 sweeps across the concentric circles, such outer circle representing an increased tilt of the device. Each circle is identified with a humorous text, the text of each outer ecircle text indicating a more serious earthquake condition.

The base is made hollow, so as to enclose a dry cell battery 20 and a buzzer, bell or light 21 which are in an electrical circuit 22 with the ring 13 and with the rod 14, so that when the device is tilted to the inclined angle shown in FIG. 2, the rod contacts the ring so that they serve as contacts of a switch thus formed, in the circuit and accordingly activate the warning, buzzer, bell or light at such time.

As shown in the drawing the frame clips around diametrically opposite edges of the base and may additionally be firmly secured thereto be screws or the like. Also the strips 16 are shown to be bent at each end into hooks for holding to the frame and to the ring.

In a modified design of earthquake indicator 23, shown in FIG. 3, the ring 13a is pivotable relative to the two supporting strips 16a, so that the rod thus contacts the two opposite sides of the ring at a lesser tilt of the device in one plane.

FIG. 3 also shows the base having a circular top panel 24 tiltable about a plane that is at right angle to the tilt plane of the ring, so that with the circles 19 drawn upon the panel, then the opposite sides of the circles are crossed by the ball 18 more quickly when the panel is tilted, and even though the device still rests on a horizontal surface. Thus the zones defined by the circles may selectively be more readily reached by the ball 18 and the warning alarm be likewise more readily activated.

Thus, for purpose of entertainment, the device can be set to frighten some persons that the danger of an earthquake is more imminent.

While various changes may be made in the detail construction, it is understood that such changes will be within the spirit and scope of the present invention as is defined by the appended claims.

What is claimed:

1. An earthquake indicator, comprising in combination, a circular base, an inverted U-shaped frame affixed on said base, a circular ring supported by strips underneath said frame, and a depending rod from said frame, passing through said ring, said rod and ring comprising contacts of a switch in a warning electric circuit, a plurality of circles marked upon said base defining earthquake intensities, and means to adjust said indicator.

2. The combination as set forth in claim 1 wherein said means comprises said ring being pivotaly mounted on said strips.

3. The combination of claim 2 wherein said means further includes a base which is pivotaly mounted on said frame.

* * * * *